United States Patent Office
3,389,490
Patented June 25, 1968

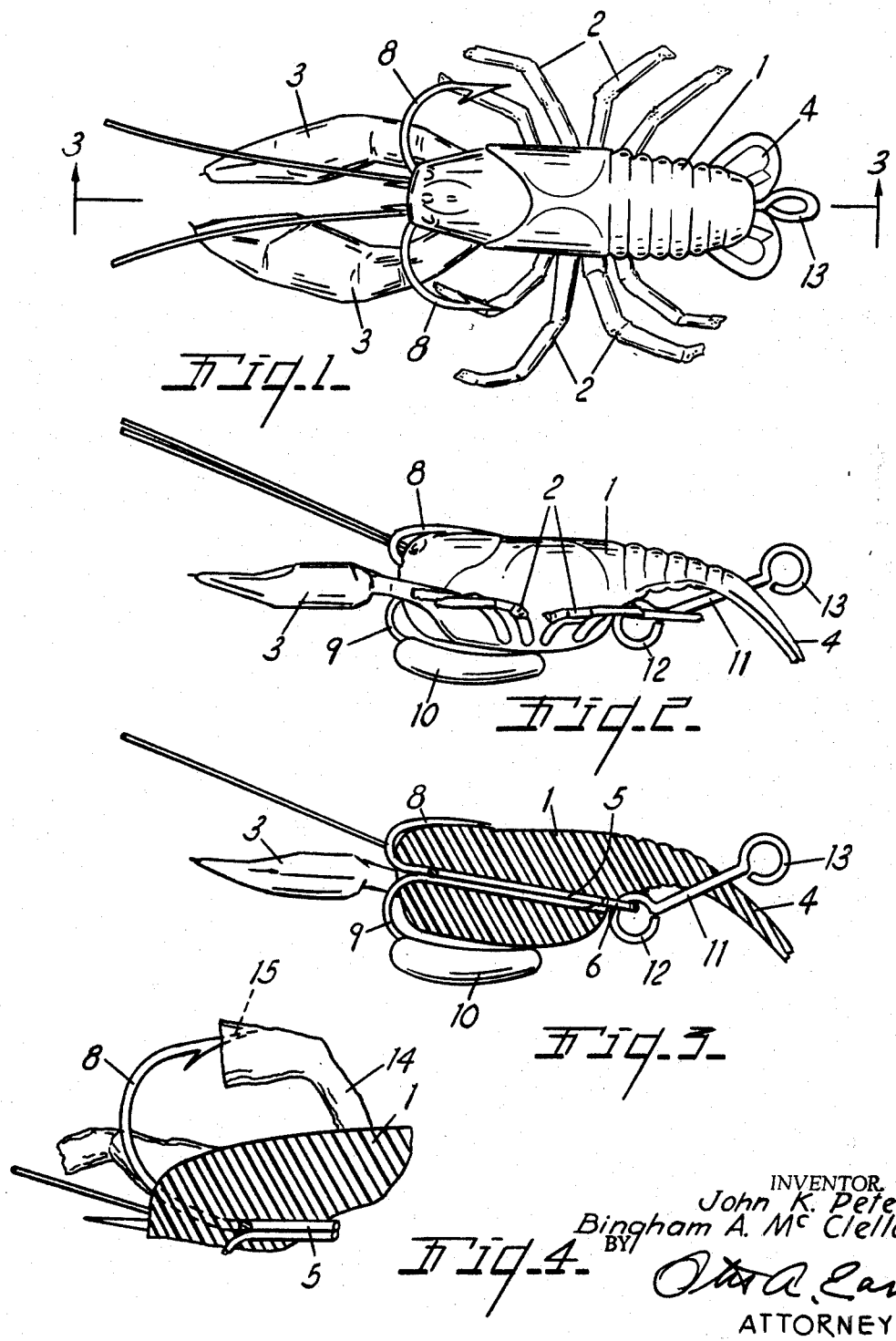

3,389,490
FISHING LURES
John K. Peters and Bingham A. McClellan, Traverse City, Mich., assignors to Burke Flexo Products Company, Traverse City, Mich.
Filed July 12, 1965, Ser. No. 471,324
3 Claims. (Cl. 43—42.1)

ABSTRACT OF THE DISCLOSURE

A solid body of springable thermoplastic material simulating the three dimensional shape of a crayfish including body, head, legs, claws and rearwardly tapering tail with laterally flared ends, a three gang hook having the joined shanks of three hooks extending from the head to an eye located at the rear of the body below the tail, the hooks on the upper two shanks extending laterally outwardly and upwardly from the body and having barbed ends spaced from the sides of the head, the hook of the third shank extending downwardly in relatively closely spaced relation to the bottom of the body, an elongated weight attached to the lower hook below the body and covering the end of the hook; and a connector link extending upwardly and rearwardly through the tail, the link having an eye on the front end engaged through the eye on the front of the shanks of the treble hook, and another eye on its upper rear end attachable to a line, the position of the connector link through the tail acting to hold the tail down.

As a modification, the ends of an opposed pair of the legs being enlarged and adapted to be impaled on the pointed barbs of the upper two hooks to act as weed guards.

---

The main objects of this invention are:

First, to provide a fishing lure of the crawfish type with a hook and line coupling assembly which relieves the body of stress either in casting or when engaged by a fish.

Second, to provide a fishing lure of this type which acts to maintain the lure in upright position as it is being translated through water.

Third, to provide a fishing lure including a multi-prong hook which is supportedly engaged with the body, the hook being mounted on one of the prongs and in overlying relation to the body.

Fourth, to provide a fishing lure of the crawfish type including a hook to which the body is supportedly connected, one of the legs or projections on the body constituting a guard for the point of the hook.

Objects relating to details and economies of the invention will appear from the description to follow. The invention is defined and pointed out in the claims.

A preferred embodiment of the invention is illustrated in the accompanying drawing, in which:

FIG. 1 is a plan view of a lure of the crawfish type embodying my invention.

FIG. 2 is a side view thereof.

FIG. 3 is a longitudinal section of the body portion one a line corresponding to line 3—3 of FIG. 1.

FIG. 4 is a fragmentary view of a modified form of my invention in which a leg member constitutes a guard for the point of the hook acting to prevent the hook engaging weeds or the like as the hook is propelled through the water.

In the embodiment of my invention illustrated the body member 1 is of crawfish design and includes laterally projecting portions 2 commonly called legs and a pair of claw members 3 which project forwardly from the front end of the body. The body member 1 is desirably formed of springably resilient thermoplastic material. The body member also includes a rearwardly and laterally projecting fin-like tail portion 4. The shank 5 of the three pronged hook is disposed through the body member with the eye 6 of the shank projecting from the body member below the tail portion 4.

The hook prongs 8 project laterally from the body member in substantially spaced relation thereto. The third hook prong 9 projects under the body member and an elongated weight 10 is mounted thereon desirably of some metallic material which is molded on the prong to cover the end thereof and constitutes a guard for the end of the prong 9. The line coupling link 11 is arranged through the tail portion 4 and has a coupling 12 at its inner end engaged with the eye 6 of the hook shank and the coupling link is provided with an eye 13 at its outer end which is adapted to receive a line or coupling means for a line. With the parts thus arranged the lure is maintained in upright position as it is propelled through the water. The link 11 holds the tail 7 down so that its acts as a vane to give the body a natural oscillating movement as it is pulled rearwardly in the natural motion of a crayfish. The body is not subjected to propelling stress and in the event of a strike the body member does sustain the load on the hook.

In the embodiment shown in FIG. 4 the legs 14 are designed to constitute guards for the prongs of the hook, these legs 14 terminating in enlargements 15 to which the points of the hooks 8 are impaled. The legs 14 are flexibly resilient and are sprung off from the point of the hook in the event of a strike but these guards prevent the hooks being engaged with weeds as the lure is being propelled through water.

I have illustrated and described my invention in a highly desirable embodiment thereof. It should be understood that while my invention is particularly desirable for embodiment in lures of the general type illustrated the form of the body may be greatly varied within the scope of my invention.

What I claim as new is:

1. A fishing lure comprising a body member of flexibly resilient nonabsorbing material conformed in three dimensions to simulate a crayfish or the like and including a tail portion of substantial width and tapering thickness with oppositely projecting fin-like portions on its rear end, said body member also having flexible crayfish simulating leg portions on the sides thereof, a three-pronged hook disposed with the shank thereof embeddedly disposed longitudinally in said body member with the eye thereof projecting from the body member below the tail portion of the body member, the prongs of the hook being disposed at the head of the body member with two of the prongs projecting in reversely curved spaced relation laterally therefrom and the third prong projecting below and in closely spaced relation to the body member, a line coupling link disposed in downwardly bending engagement through the tail portion of the body member with one end swingably engaged with the eye on the shank of the hook and its outer end having a line attaching eye, and an elongated weight mounted in surrounding relation to the prong of the hook disposed below the body member with the end of the weight contacting the bottom of the body.

2. A fishing lure comprising a body member of flexibly resilient nonabsorbing material conformed in these dimension to simulate a crayfish or the like and including a tail portion of substantial width and tapering thickness with oppositely projecting fin-like portions on its rear end, said body member also having flexible crayfish simulating leg portions on the sides thereof, a multi-pronged hook disposed with the shank thereof embeddedly disposed longitudinally in said body member with the eye thereof projecting from the body member below the tail portion of the body member, the prongs of the hook being disposed at the head of the body member with one of the prongs projecting in reversely curved spaced relation relative to the head and with another prong projecting below and in closely spaced relation to the body member, a line coupling link disposed in downwardly bending engagement through the tail portion of the body member with one end swingably engaged with the eye on the shank of the hook and its outer end having a line attaching eye, and a weight mounted on the prong of the hook disposed below the body member.

3. A fishing lure as defined in claim 1 in which a pair of said leg portions have enlarged outer ends adapted to be impaled on the points of the barbs of said two prongs.

References Cited

UNITED STATES PATENTS

| | | | |
|---|---|---|---|
| D. 188,114 | 6/1960 | Wendling | 43—42.39 X |
| 1,689,541 | 10/1928 | Welch | 43—42.39 X |
| 1,813,722 | 7/1931 | Wright et al. | 43—42.36 X |
| 2,218,280 | 10/1940 | Deering | 43—42.26 |
| 2,292,592 | 8/1942 | Wright | 43—42.39 X |
| 2,590,461 | 3/1952 | Rasch | 43—42.1 |
| 2,820,314 | 1/1958 | Scott | 43—42.1 |
| 539,149 | 5/1895 | Shattuck | 43—42.1 |
| 824,817 | 7/1906 | Rhodes | 43—42.43 X |
| 882,344 | 3/1908 | Rhodes | 43—42.43X |
| 2,191,244 | 2/1940 | Wise | 43—42.1 |
| 2,462,437 | 2/1949 | Tallaksen | 43—42.43 |

SAMUEL KOREN, *Primary Examiner.*

ALDRICH F. MEDBERY, *Examiner.*

D. J. LEACH, *Assistant Examiner.*